Figure 1:
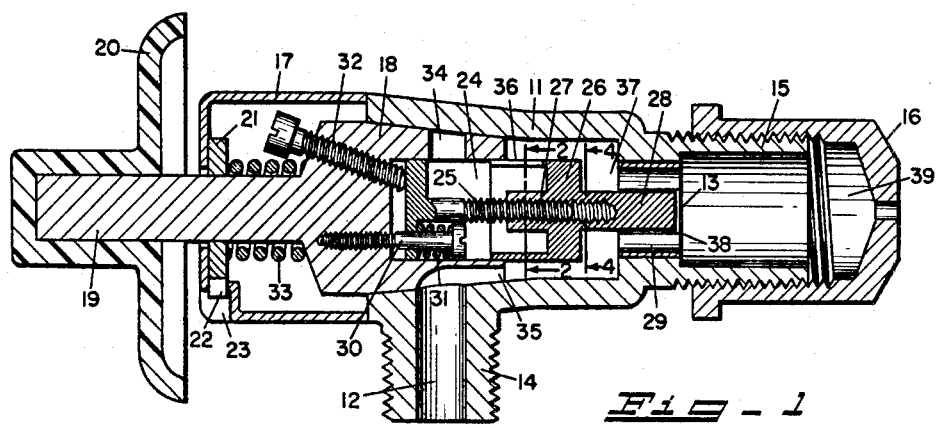

Sept. 26, 1961     I. V. BRUMBAUGH     3,001,547

UNIVERSAL GAS VALVE

Original Filed Aug. 23, 1955     2 Sheets-Sheet 1

United States Patent Office 3,001,547
Patented Sept. 26, 1961

3,001,547
UNIVERSAL GAS VALVE
Isaac V. Brumbaugh, Clayton, Mo.
(6906 Avondale Road, Baltimore 12, Md.)
Original application Aug. 23, 1955, Ser. No. 530,123, now Patent No. 2,893,426, dated July 7, 1959. Divided and this application Jan. 2, 1959, Ser. No. 784,626
3 Claims. (Cl. 137—614.17)

This invention relates to improved valves and, particularly, to gas valves that are adjustable to a wide variety of fluids and pressures. These valves are particularly useful to control the burners of kitchen ranges, but it is to be understood that they are adaptable to many other uses.

This application is a division of my application Serial No. 530,123, filed August 23, 1955, now Patent No. 2,893,426.

In the manufacture and use of gas appliances, there has long existed a need for adjustable valves that can be used universally and, regardless of the source, pressure, and type of inflammable fluid used, provide a predetermined heat for a given setting of the valve handle. The valves in today's kitchen ranges commonly have no markings. These valves typically consist of a simple inlet and outlet and a plug having a single passage therethrough positioned within the casing and adapted at times to connect the inlet opening with the outlet opening. Adjustment or "turn-down" of the flame is accomplished by partial closing or constriction of the passageway by the process of turning the plug so that the passage through it is displaced slightly out of registration with the ports in the casing. When installed in different communities where gas pressures vary and the type of combustible gas available is different, a wide variety of flames are obtained for any particular setting of the valve handle. Similarly, when using the conventional valve, the flame cannot be accurately controlled. When turning the handle of conventional valves, a more-or-less constant flame is obtained until the handle has been turned about 170 degrees of rotation; between 170 and 200 degrees, nearly full pressure is obtained. Thus, the flame goes from near-simmer to full-on in a relatively slight turn of the handle. As a result, it is nearly impossible to obtain even approximately the same flame each time the valve is set, which is a great inconvenience when preparing food on a kitchen range.

In U.S. Patents 2,626,160, 2,650,610, 2,650,612, and 2,650,613, valves are disclosed in which the gas may not only be turned on and off, but also the size of the flame may be varied uniformly as the valve is rotated between the "off" and "on" positions. These valves may have dial knobs on which various numbers are placed and thus for a given setting of the valve handle the flame provides a predetermined amount of heat. They are also adjustable so that the valve may be adjusted in accordance with the source of the fluid available, and for a given setting of the valve handle the valve may be adjusted to provide a predetermined amount of heat regardless of the source of fluid.

It has been found that by means of the valves of the present invention, improved accuracy and adjustability may be attained over the valves disclosed in the above-identified patents.

The valves of the present invention are made of parts that are easily reproducible by today's production methods, and are easily assembled and adjusted. They are much less susceptible to incorrect assembly and adjustment than the prior-art valve. These valves accurately control the size of a flame, as it is varied uniformly between the "on" and "off" positions. They are also adjustable so that for a given setting of the valve handle the valve may be adjusted to provide a predetermined amount of heat, regardless of the source of gas.

The valves of the present invention are generally characterized by the metering effect of a tapered port which is opened or closed to the flow of fluid by the longitudinal movement of a sleeve. Specifically, the following are embodiments of the present valves:

Positioned in a valve casing which is provided with inlet and outlet ports is a hollow, rotatable valve plug provided with an elongated slot, which cooperates with the inlet port when rotated, to allow fluid to flow into the valve. Also positioned within the casing is a hollow cup-like sleeve, formed with a tapered port. The sleeve is partially telescoped into the plug and is threaded to a screw attached to the plug, but is keyed to the casing so that it does not rotate with the plug. The sleeve thus moves longitudinally in accordance with the pitch of the threads which attach the sleeve to the rotating plug. This motion adjusts an opening created by the tapered port so that the rear edge of the plug increases or decreases the area through which gas passes, and thus meters the gas in accordance with the position of the sleeve relative to the plug. Means are also provided to vary the longitudinal position of the sleeve relative to the plug, so that the flame for the simmer-position and for the other positions may be adjusted to compensate for gases of different heating values. This is accomplished by adjusting the longitudinal positions of the screw, which is connected to the sleeve, and which rotates with the plug and provides the longitudinal movement of the sleeve when turning the valve. In one embodiment, this screw is attached to the plug by another screw which slips through an opening in the head of the main screw, and is threaded in the plug. A spring about the head of this screw exerts pressure on the head of the main screw, pushing it forward in the valve, but allows the main screw some leeway to move longitudinally. A third screw angularly positioned and extending through the plug, exerts pressure to force the main screw toward the rear of the valve. Thus, an adjustment of the angularly positioned screw adjusts the position of the screw and the sleeve in either direction longitudinally which adjusts the opening created by the tapered port and the rear edge of the plug for a given setting of the valve.

In another embodiment, the hollow sleeve contains a threaded projection extending forwardly from the center of the sleeve and threaded into the end of a rod which is positioned concentrically through the plug. The rod rotates with the plug, thus effecting longitudinal movement of the sleeve, as described above. A longitudinal adjustment of the concentric rod, by turning, adjusts the longitudinal position of the sleeve, so that the flame can be adjusted to a given heat for any setting of the knob.

In another embodiment of this invention, the cup-shaped member formed with a tapered port is positioned inside the hollow of the plug in such a manner that the area of the tapered port available for fluid flow is determined by longitudinal position of the plug in relation to the elongated slot in the plug which also cooperates with the inlet port of the valve.

In another embodiment positioned within a valve casing provided with an inlet and an outlet port is a hollow rotatable valve plug provided with an elongated slot associated with the inlet port, as above. This valve is provided with two small hollow tube-like members, which may be positioned within the plug. One tube is stationary, formed with a tapered port and threaded on its inner surface in the rear end of the valve. The other tube is telescoped into the stationary tube and is formed with two diameters, a port in the smaller diameter, the smaller diameter is threaded to the staionary tube, and the larger diameter is keyed to rotate with the valve plug. By rotating the plug, the tube rotates and moves longitudinally in accordance with the pitch of the threads in the threaded area. Movement of the rotatable member moves the shoulder of its large diameter back and forth over the tapered port thus varying the opening of the tapered port and metering the flow of gas. The valve is adjusted to effect a predetermined amount of heat for a given setting of the valve handle by changing the longitudinal position of the rotative tube relative to the tapered port at a given setting of the knob. This is accomplished by adjusting a rod positioned concentrically through the plug which effects a longitudinal adjustment of the rotatable tube. Thus the tube may be rotated until the desired flame is obtained while maintaining the knob at the desired setting.

Another modification of the valve is to place the tapered port in the rotative tube so that it cooperates with the forward edge of the stationary member and thus meters the flow by longitudinal motion which restricts the tapered port relative to the stationary tube. Adjustment of the longitudinal position of the rotative tube would be accomplished in the same manner as described in the above valve.

In all the embodiments mentioned above, a metering effect is accomplished by restricting or widening the area of tapered port through which the fluid must pass. The area of the tapered port available for fluid flow is determined by the longitudinal position of a tube or cup-shaped member and the longitudinal movement of this member is accomplished by rotational movement of a threaded area. It should be noted that in each case the port is so placed that the most restricted or pointed area is the last to be covered by the longitudinal movement of the sleeve or tube in turning off of the valve. Only the pit or smallest portion is exposed when the knob is set at the "simmer" position.

The primary object of this invention is, therefore, to provide a gas valve that will vary the flow of gas uniformly as the valve is rotated between the "off" and "on" position.

Another object is to provide a gas valve which can be adjusted so that for a given setting of the valve handle the flame provides a predetermined amount of heat.

Another object is to provide a valve in which relatively large numbers of predetermined heat-rendering flames are selectively possible.

A further object is the provision of a valve which contains relatively few parts and which is relatively easy to assemble, manufacture, and adjust.

Another object of this invention is to provide a valve which operates on the principle of a tapered port which cooperates with the longitudinal movement of a sleeve or tube passing over the face of the port to open or close the area available for fluid flow, the movement being effected by the pitch of threaded screws.

Still another object is to provide a valve which operates on the principle of a tapered port in a sleeve or tube, capable of longitudinal movement effected by the pitch of a threaded area, to open or close the area available for fluid flow, by cooperation with a longitudinally stationary member.

Another object is to provide a valve which operates on the principle of a tapered port in a sleeve or tube which cooperates with another member to open or close the area available for fluid flow by longitudinal movement effected by the pitch of a threaded area, in which the position of the longitudinally movable member can be further adjusted longitudinally so as to change the area available for fluid flow at any setting of the valve knob.

Further objects and advantageous features are apparent from the following specification and claims.

Figure 2:
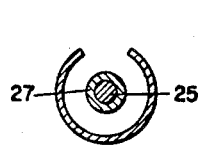
Figure 3:
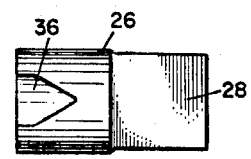
Figure 4:
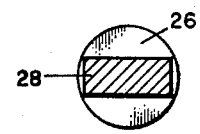
Figure 5:
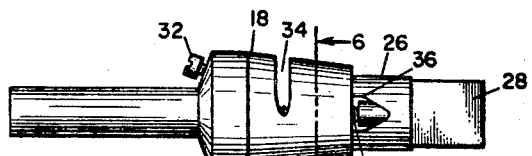
Figure 6:
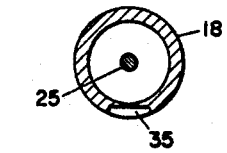
Figure 7:
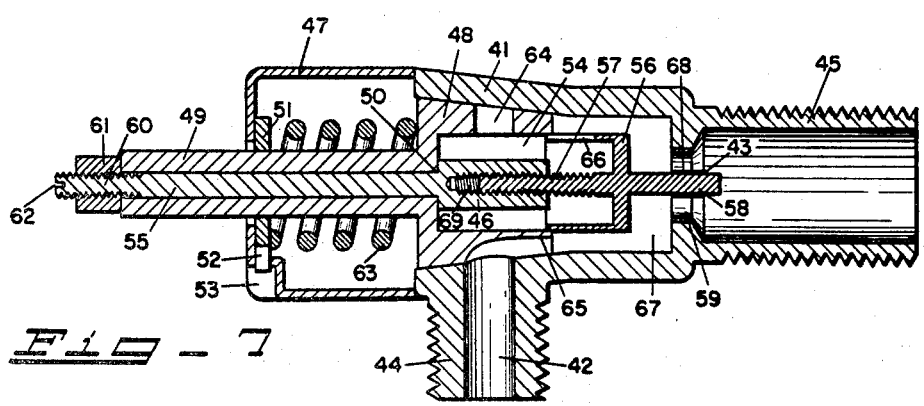
Figure 8:
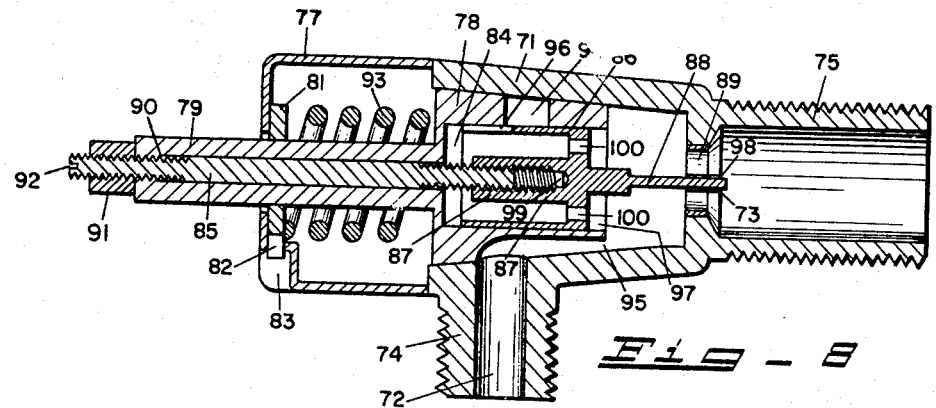
Figure 9:
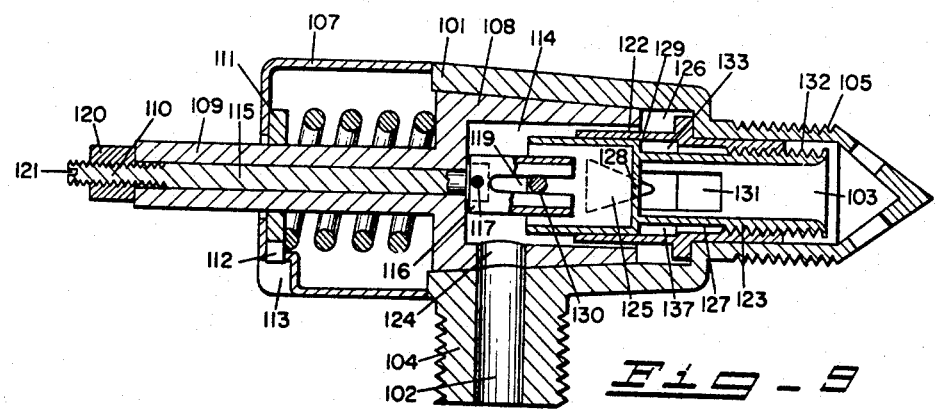
Figure 10:
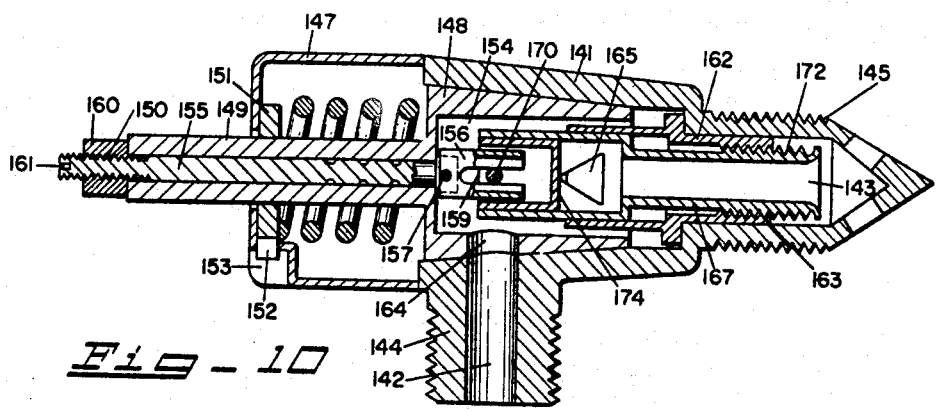

In the drawings:

FIG. 1 is a longitudinal sectional view of the valve;
FIG. 2 is a view in vertical section of the forward end of sleeve 26 taken at right angles to the section of FIG. 1 at the line 2—2 thereof;
FIG. 3 is a view in elevation of the sleeve of the valve of FIG. 1;
FIG. 4 is a view in vertical section of the rear end of sleeve 26 taken at right angles to the section of FIG. 1 at the line 4—4 thereof;
FIG. 5 is a view of the plug in elevation of the valve of FIG. 1;
FIG. 6 is a cross-sectional view of the plug taken on the line 6—6 of FIG. 5;
FIG. 7 is a longitudinal sectional view similar to FIG. 1 showing an alternative form of the valve;
FIG. 8 is a longitudinal sectional view similar to FIG. 1 showing another alternative form of the valve;
FIG. 9 is a longitudinal sectional view through the side of another valve constructed according to this invention; and
FIG. 10 is a longitudinal sectional view similar to FIG. 9 showing an alternative form of the valve.

Referring to FIG. 1, a hollow valve casing 11 has an inlet port 12 and an outlet port 13. The inlet port 12 enters through a downwardly extending inlet boss 14 which may be connected to an inlet gas manifold (not shown). The outlet port 13 enters into a threaded projection or nozzle 15 onto which is threaded an orifice cap 16 which preferably extends into a mixing tube (not shown).

The valve is provided with a spring cap 17 forming a casing or cover over the forward portion of the valve. Within the case 11 is a plug member 18 having a stem 19 which extends forwardly through the spring cap 17 and on which is a removably secured knob or dial member 20. Associated with the stem 19 is a stop sleeve 21 which has a projection 22 which cooperates with a shelf 23 projecting from the spring cap 17 to limit the movement of the knob 20. Thus, the stem 19 and the plug 18 may not be turned beyond the "off" position when rotated in a counterclockwise direction or the "on" position when rotated in the clockwise direction. The spring cap 17 is bolted to the casing 11 in any conventional manner. Stem 19 is not perfectly round in vertical section and stop sleeve 21 is made to slip snugly around stem 19 so that it must turn with the stem. Also, knob 20 fits snugly onto stem 19 and thus stem 19 and plug 18 must rotate when knob 20 is revolved.

The plug member 18 is hollow as at 24 and houses within the hollow space 24 a screw 25, the head of which is located in the forward portion of the plug 18 and the threaded portion of which projects rearwardly through the plug. Also, within the hollow of casing 11 and telescoping into plug 18 is a cup-shaped sleeve 26. This sleeve member 26 has a center portion 27 projecting forwardly into the hollow of the sleeve and contains a threaded area into which the screw 25 is threaded. The sleeve also contains a key or projection 28 extending rearwardly in the valve which fits into a stationary slotted member 29. This may be seen more clearly by referring to FIGS. 3 and 4. The screw 25 is resiliently held in position by an offcentered screw 30, threaded into the plug 18 and extending through an offcenter opening in the head of screw 25. A spring 31 bears on the head of screw 25 and at its opposite end on the head of screw 30. Bearing on the other side of the head of screw 25 is an obliquely extending adjustment screw 32 threaded through the head of plug 18. It will be noted that this adjustment screw is wholly within the spring cap 17. The adjustment screw 32 acting on screw 25 positions the sleeve 26 as may be desired, since spring 31 maintains screw 25 always in contact with screw 32. Positioned around stem 19 of plug 18 is a spring 33. The spring 33 maintains the stop sleeve 21 and the plug 18 in correct position.

Referring to FIGS. 1, 5, and 6, the plug 18 is formed with a slot 34 which in certain positions communicates with inlet port 12 which, as is explained in more detail below, allows gas to pass into the hollow of the valve. Referring to FIG. 6, a slot 35, as explained below, acts as a bypass when the plug is rotated to a certain position.

Referring to FIGS. 1, 3, and 5, the sleeve 26 is formed with a tapered port 36. The sleeve 26 is partially telescoped into plug 18 so that a portion of port 36 is exposed to void 37. Key 28 is loosely projected into the slot 38, which is also port 13, with sufficient room for fluid to pass around it. Sleeve 26 is free to move longitudinally; however, key 28 prevents rotation of sleeve 26. As can be seen in FIGS. 3 and 5, the narrow end of the tapered port 36 projects beyond plug 18 in accordance with the longitudinal position of the sleeve 26.

The operation of the valve in FIG. 1 will be obvious from the description of the valve as shown in FIG. 1 in the full "on" position. Slot 35 communicates with inlet port 12 so that fluid may pass freely into the open area of casing 11 bypassing sleeve 26 and into area 37. From area 37 it may pass freely through slot 38 around key 28 and through orifice cap 16 into a mixing tube and thence to the burner. If the valve is turned counterclockwise so that plug 18 and thus stem 19 and sleeve 21 are rotated until projection 22 contacts stop 23, the valve is in the "off" position. In this position, neither slot 35 nor elongated slot 34 communicates with inlet port 12 and no fluid may pass into plug 18, sleeve 26, or void 37. Also, screw 25 has rotated with the plug while sleeve 26 has been prevented from rotating by key 28 and slot 38 and has thus moved longitudinally forward due to the action of the threading of screw 25 into the threaded projection 27 of sleeve 26. The movement of sleeve 26 forward in the valve has closed off the area or port 36 projecting beyond the rearward edge of plug 18. If the knob 20 is rotated clockwise to the position marked on the knob for the smallest or "simmer" flame at the burner, at least a part of elongated slot 34 communicates with inlet port 12 so as to allow fluid to pass from port 12 through slot 34 into plug 18 and sleeve 26. Due to the rotation of screw 25 in a clockwise direction, sleeve 26 has moved a short distance longitudinally rearwardly in the valve so as to extend a small portion of port 36 beyond the rear edge of plug 18. A small amount of fluid is thus metered out of the exposed area of port 36 into void 37 and thus through slot 38, orifice 39 and on to the burner.

The valve in this position may then be adjusted by turning screw 32 to move screw 25 longitudinally and thus sleeve 26 longitudinally. If screw 32 is retracted, screw 25 and sleeve 26 will be displaced forwardly due to the forward pressure on the head of screw 25 exerted by spring 31 around the screw 30. If screw 32 is turned to push the head of screw 25 against the pressure of spring 31, screw 25 and sleeve 26 will be displaced rearwardly. Adjustment of screw 32 determines exactly the area of port 36 extending beyond plug 18 by the longitudinal movement of sleeve 26. Thus, for a given setting of knob 20 a desired heat-rendering flame in simmer position may be obtained by the proper adjustment of screw 32 regardless of the fluid source.

As knob 20, and thus stem 19 and plug 18, are further rotated in a clockwise direction to various predetermined positions on the knob, it can be seen that slot 34 will continue to cooperate with inlet 12 so as to allow gas to flow into plug 18 and sleeve 26. Also, any further clockwise movement of knob 20 and plug 18 from the simmer position causes further rearward longitudinal movement of sleeve 26 and thus an increase of open area of port 36 through which fluid will flow. Thus, for each position of the knob nearer to the "on" position, a correspondingly larger burner flame is provided. The adjustment of the "simmer" position of knob 20 to a desired predetermined heat-rendering flame effects each position of the knob in that a correspondingly larger or smaller area of port 36 is available at each position so that one adjustment of the simmer flame provides equivalent standard heat-rendering flames for each of the other predetermined positions on knob 20. It is of course obvious that the adjustment of the burner flame could be made at any given setting of the knob and other positions should then render desired predetermined heat-rendering flames regardless of the source of gas.

When the valve approaches and is in the full "on" position, both void 35 and slot 34 may cooperate with inlet 12 so that there is no position of the plug in this area in which gas is prevented from flowing from inlet 12 into void 24. In fact, both void 35 and slot 34 may cooperate with inlet 12 when the knob is in the full "on" position, the purpose of slot 35 being to assure a maximum flow of fluid through the valve.

In the modified embodiment shown in FIG. 7, the valve casing 41 has an inlet port 42 which enters through a boss 44 which may be connected to a gas manifold (not shown) and an outlet port 43 which leads into a threaded projection 45 and thence to an orifice cap (not shown) which extends into a mixing tube (not shown). The valve is provided with a spring cap 47 covering the forward part of the valve. The plug 48 is provided with a stem 49 extending forwardly through the spring cap 47. A knob (not shown) fits snugly over stem 49. Stop sleeve 51 fits snugly around stem 49 so as to rotate with stem 49 and plug 48 until projection 52 of stop sleeve 51 comes into contact with a shelf 53 which is formed with spring cap 47. Thus, stem 49 and plug 48 may not be turned beyond the "off" position of the valve when rotated in a counterclockwise direction or the "on" position when rotated in the other direction. Spring cap 47 is bolted to casing 41 in any conventional manner. Plug 48 is hollow as at 54 and is formed with a longitudinal axial bore through which the relatively long screw 55 extends. Screw 55 is formed with a projection 46 which extends rearwardly into the hollow of the plug 48 or void 54. Projection 46 is provided with a threaded receptable 69. Screw 55 projects forwardly through and beyond stem 49 and is threaded at 60. Nut 61 is threaded to screw 55 at 60 and screw 55 may be tightly secured to stem 49 by tightening nut 61. When nut 61 is tightened or drawn tightly to stem 49, the shoulder 50 of projection 46 of screw 55 is drawn up tightly against plug 48 so that screw 55 rotates with stem 49 and 48. Plug 48 is provided with an elongated slot 64 and a bypass slot 65. Stem 49 is provided with a spring 63 which bears against stop sleeve 51 and plug 48 in order to maintain the sleeve 51 and the plug 48 in spaced relationship. Partially telescoped into plug 48 and extending rearwardly therefrom is a cup-shaped sleeve 56 which is formed with a threaded projection 57 extending forwardly into the hollow of plug 48 and void 54 and is threaded into threaded area 69 of projection 46 of screw 55. Sleeve 56 is formed with tapered port 66 and is also provided with a rearwardly extending key 58 which extends loosely through slot 68 of stationary slotted member 59. On the most forward end of screw 55 is a screw driver receptacle 62.

The operation of this embodiment is similar to the embodiment previously described. The threaded area of the cup shaped sleeve 56 and the adjustable screw 55 must be reversed if the effect of rotating the knob in one direction or another is to be the same as the previous embodiment. Features not obvious from the description of the operation of the previous embodiment is the adjustment of sleeve 56 for a standard heat-rendering flame for a given position of the knob. To adjust the flame, the knob is set at the "simmer" or any given position. The knob is removed and nut 61 is loosened. Screw 55 is then revolved. Depending, of course, upon the direction of the pitch of the threaded area of projection 57 of sleeve 56 and area 69 of projection 46 of screw 55, by revolving screw 55 in one direction sleeve 56 and thus port 66 will move forward longitudinally and if revolved in the other direction sleeve 56 and thus port 66 will move rearwardly longitudinally thus opening and closing the area of tapered port 66 available for fluid flow and adjusting the flame for any given setting of the knob.

In the modified embodiment shown in FIG. 8, the valve casing 71 has an inlet port 72 and an outlet port 73 accompanied with appropriate downwardly extending boss 74 and forwardly extending threaded projection 75 which may be connected to appropriate gas manifold and stove mixing tubes (not shown). This valve is provided with a spring cap 77 which covers the forward part of the valve, a plug member 78 having a stem 79 which extends forwardly through the spring cap 77 and on which there is secured a knob or dial member (not shown). Associated with stem 79 is a stop sleeve 81 which has a projection 82 which cooperates with shelf 83 formed with spring cap 77 to limit the rotational movement of the knob stem 79 and plug 78 from rotating beyond the "on" and "off" positions of the valve knob. Plug member 78 is hollow at 84 and is formed with a longitudinal axial bore extending through stem 79 through which a relatively long screw 85 extends. One end of screw 85 projects into the hollow of plug 78 or into void 84 and is threaded. Screw 85 projects forwardly through the stem 79 and extends beyond stem 79. The forward outside surface of screw 85 and the forward inside diameter of the axial bore of stem 79 are threaded at 90 and these two members (screw 85 and stem 79) are threaded into one another. Nut 91 is threaded onto the threaded forward end of screw 85. By tightening nut 91, screw 85 is drawn up tightly against stem 79 so that screw 85 rotates with stem 79 and plug 78. Plug 78 is provided with an elongated slot 94 and bypass slot 95. Stem 79 is provided with a spring 93 which bears against stop sleeve 81 and plug 78 in order to maintain sleeve 81 and the plug 78 in a spaced relationship. Positioned within plug 78 is a cup-shaped sleeve 86 which is formed with a projection 87 which extends forwardly and which is provided with a threaded receptacle 99 into which screw 85 is threaded. Sleeve 86 is formed with a tapered port 96 which lies contiguous to slot 94 of plug 78. Sleeve 86 is also formed with ports 100 which permit the flow of fluid to pass out of sleeve 86 to void 97 and outlet port 73. Sleeve 86 is provided with a rearwardly extending key 88 which extends loosely through slot 98 of stationary slotted member 89. On the most forward end of screw 85 is a screw driver receptacle 92.

The operation of the embodiment shown in FIG. 8 is similar to that of the embodiment previously described. In this embodiment, the gas enters at inlet port 72 and may pass through slot 95 into void 97 through port 73 (slot 98), and on to the gas burner when the valve is at the full "on" position. When the valve is rotated to the full "off" position neither slot 95 nor slot 94 cooperates with inlet port 72 so that no gas may pass through the valve. When the valve is set at any of the intermediary settings, slot 94 lies contiguous to inlet 72 so that gas may pass from 72 through slot 94 and thus through port 96 into void 84 and then through ports 100, into void 97 through port 73 and on to the burner. The amount of gas passing through port 96 is metered by the position of port 96 in relation to slot 94. Cup 86 moves longitudinally to open and close the area of port 96 available for gas flow when the knob (and thus the stem 79, plug 78 and screw 85), is revolved, the amount of the movement of the cup 86 being determined by the pitch of the threaded area of projection 87, area 99 and the screw 85.

Adjustment to a standard heat-rendering flame for a given setting of the knob on "simmer" or other given knob setting is accomplished by removing the knob, loosening nut 91, inserting a screw driver into the slot of screw 85 at 92 and rotating screw 85, the amount of movement of the cup 86 being determined by the pitch of the threaded areas of screw 85 and receptacle 99. Cup 86 will then move in one direction or the other longitudinally opening or closing the area of port 96 to which gas must flow by drawing cup 86 and thus the port 96 over the forward edge of slot 94 of plug 78.

In the modified embodiments shown in FIG. 9, the valve casing 101 has an inlet port 102 which enters through a boss 104 which may be connected to a gas manifold (not shown) and an outlet port 103 which leads into a threaded projection 105 and thence into an orifice cap (not shown) which extends into a mixing tube (not shown) for a gas burner (not shown). The casing 101 is provided with a spring cap 107 covering the forward part of the valve. Plug 108 is provided with a stem 109 extending forwardly through a spring cap 107. A knob (not shown) fits snugly over stem 109. Stop sleeve 111 fits snugly around stem 109 so as to rotate with stem 109 and plug 108 until the projection 112 of stop sleeve 111 comes into contact with shelf 113 which is formed with spring cap 107. Thus stem 109 and plug 108 may not be turned beyond the "off" position when rotated in one direction or the "on" position when rotated in the other direction. Spring cap 107 is bolted to casing 101 in any conventional manner. Plug 108 is hollow at 114 and is formed with a longitudinal axial bore extending through stem 109 through which a relatively long screw 115 projects. Screw 115 extends into the hollow of plug 108 and projects forwardly beyond stem 109 where it is threaded at 110. Also, at the forward end of screw 115 is a slot 121 suitable to receive a screw driver to adjust screw 115. Nut 120 is threaded onto the threaded projection 110 of screw 115 and is drawn up tight to stem 109 so that screw 115 will rotate with stem 109 and plug 108. Attached to screw 115 inside the hollow of plug 108 and projecting rearwardly is a fork 116. Fork 116 is attached to screw 115 by means of pins 117 which project through openings in the screw 115 and fork 116. Fork 116 is formed with a slip joint 119. Plug 108 is provided with an elongated slot 124 which in certain positions communicates with inlet port 102.

Positioned within casing 101 is a hollow tubular member 122 which is keyed or attached in any conventional manner to the threaded projection 105 of casing 101. Tube 122 is threaded in its inside rear diameter at 123 and is provided with a tapered port 125 which is positioned within casing 101. Tube 122 telescopes partially into plug 108 but allows for a void space 126 between tube 122, plug 108 and casing 101. Also positioned within casing 101 is a second hollow tube 127. The second tube 127 is formed with two diameters, separated by a solid partition 128 and possessing a shoulder at 129. A pin 130 is centrally located and running across the forward end of the large diameter of tube 127. A port 131 is formed within the forward part of the smaller diameter, and a threaded area 132 is located at the rear end of the smaller diameter of tube 127. The threaded area of tube 127 is threaded into the threaded area of tube 122. Between the two tubes 122 and 127 there is a void space 133 created by the small diameter of tube 127. Port 125 of tube 122 opens into void 126. Fork 116 projects into the large diameter of tube 127 and pin 130 of tube 127 slips into slip joint 119 of fork 116 so that tube 127 rotates with fork 116 and screw 115 and thus plug 108 and stem 109.

The operation of the valve in FIG. 9 will be obvious from the above description of the valve. When the valve is in the "on" or any other position of the knob except the "off" position fluid may flow through slot 124 into the hollow of plug 108 or into void 114 and thence into void 126. It then may pass through port 125 into void 133 between tubes 127 and 122 and then through port 131 into the hollow of the smaller diameter of tube 127 and on through outlet 103 into the threaded projection and on to the burner. By rotating the knob and thus stem 109, plug 108 and screw 115, fork 116 will cause tube 127 to rotate and move longitudinally forwardly or rearwardly in accordance with the pitch of the threaded areas at 123 and 132. Slip joint 119 permits tube 127 to move longitudinally by allowing pin 130 to slide within slip joint 119. By moving tube 127 longitudinally forward, the area of port 125 available for fluid flow is increased and by moving rearwardly the area of port 125 available for fluid flow is reduced, thus metering the amount of gas flowing through the valve in accordance with the setting of the knob. If the knob is rotated counter-clockwise to the "off" position, stop 113 engages knob 112 of stop sleeve 111 to prevent further rotation. In the "off" position, slot 124 no longer communicates with inlet port 102 and fluid may not flow into void 114. When the knob is rotated clockwise to the "simmer" position, only a small area of port 125 projects beyond shoulder 129 of tube 127 so that only a small flame is obtained. By rotating the knob setting progressively closer to the full "on" position, tube 127 moves more and more longitudinally forward and larger and larger flames and thus heat output are attained. When the knob reaches the full "on" position, a maximum area of port 125 is available for fluid flow.

Adjustment to a standard heat-rendering flame for a given setting of the knob is attained by removing the knob, loosening nut 120, inserting a screw driver into slot 121 on screw 115 and turning screw 115. In accordance with the pitch of the threaded areas of tubes 122 and 127 at 123 and 132 tube 127 will move in one direction of the other longitudinally opening or closing the area of port 125 through which gas must flow by drawing shoulder 129 through tube 122, longitudinally thus opening or closing the area of port 125 available for fluid flow.

In the modification shown in FIG. 10, the valve casing 141 has an inlet port 142 and an outlet port 143 accompanied with appropriately downwardly extending boss 144 and forwardly extending threaded projection 145 which may be connected to an appropriate gas manifold (not shown) and gas stove mixing tubes (not shown). This valve is provided with a spring cap 147 which covers the forward part of the valve, a plug member 148 having a stem 149 which extends forwardly through the spring cap 147 and on which is secured a knob or dial member (not shown). Associated with stem 149 is a stop sleeve 151 which has a projection 152 which cooperates with shelf 153 formed with spring cap 147 to limit rotational movement of the knob, stem 149 and plug 148 from rotating beyond the "on" and "off" positions of the valve. Plug member 148 is hollow at 154 and is formed with a longitudinal axle bore extending through stem 149 through which a relatively long screw 155 extends. The rearwardly extending portion of screw 155 projects into the hollow of plug 148 and also projects forwardly beyond stem 149 where it is threaded at 150. Also at the forward end of screw 155 is a slot 161 suitable to receive a screw driver to adjust screw 155. Nut 160 is threaded onto the threaded projection 150 of screw 155 and drawn up tight to stem 149 so that screw 155 will rotate with stem 149 and plug 148. Attached to screw 155 inside the hollow of plug 148 and projecting rearwardly is fork 156. Fork 156 is attached to screw 155 by means of pin 157 which slips through openings in screw 155 and fork 156. Fork 156 is formed with a slip joint 159. Plug 148 is provided with an elongated slot 164 which at times cooperates with inlet port 142 to allow gas to flow through the valve.

Positioned within casing 141 and projecting forwardly into the hollow of plug 148 and rearwardly into threaded projection 145 is a hollow tubular member 162 which is attached in a stationary manner by any conventional means to threaded projection 145 and casing 141. Tube 162 is threaded on its inside diameter at 163. Also positioned within casing 141 is a second hollow tube 167.

Tube 167 is positioned within tube 162 and projects beyond tube 162 both forwardly and rearwardly. Tube 167 is threaded on its outside diameter at 172 and is threaded into threaded area 163 of tube 162. Tube 167 is formed with a tapered port at 165 which is positioned within casing 141 and plug 148. Port 165 is located adjacent to the forward edge of tube 162. Positioned inside the forward end of tube 167 is a cup-shaped member 174 which is attached in a stationary manner by any conventional means to tube 167 and which prevents fluid flow directly through tube 167. A pin 170 is centrally located lying across the diameter of the forward edge of cup 174 and tube 167. Fork 156 projects rearwardly into the forward diameter of the tube 167 and pin 170 of cup 174 and tube 167 fits into slip joint 159 of fork 156 so that tube 167 rotates with fork 156 and screw 155 and thus stem 149 and plug 148.

The operation of the valve in FIG. 10 will be obvious from the description of the valve as shown in FIG. 9.

In this embodiment, the gas enters at inlet port 142 and may pass through slot 164 into void 154 through tapered port 165 and onto the gas burner when the valve is on the "on" or any given position except the "off" position. When the knob is rotated in the counterclockwise direction to the "off" position, slot 164 no longer cooperates with inlet port 142 so that no gas may pass into the valve. At the same time, tube 167 has been caused to rotate by fork 156 and pin 170 due to the fact fork 156 must rotate with screw 155 which rotates with plug 148, stem 149 and thus the knob. In accordance with the pitch of the threaded areas 163 and 172 of tubes 162 and 167, tube 167 moves longitudinally rearwardly so that the area of port 165 available for fluid flow is restricted by the forward edge of tube 162. If the valve is rotated clockwise to any given setting of the knob, tube 167 moves longitudinally forward increasing the area of port 165 available for fluid flow.

Adjustment to a standard heat-rendering flame is accomplished in the same manner as the embodiment of FIG. 9. Nut 160 is loosened and a screw driver is inserted in slot 161 to rotate screw 155 thus fork 157 and tube 167 which will move longitudinally to adjust the area of port 165 available for fluid flow and in this manner obtain a given heat-rendering flame for a given knob setting.

While the above descriptions and illustrations set forth the valves of the present invention, various obvious changes and modifications can be made to each embodiment without departing from the spirit and scope of the invention.

I claim:
1. In a control valve for fuel flow, the combination of a valve casing having an inlet and an outlet for fuel, a rotatable valve member in said casing having a fuel passage affording communication between said inlet and said outlet in the open position of said valve member and defining a metering edge on said valve member, an adjusting element carried by said valve member and projecting into said fuel passage, a metering member mounted for slidable but non-rotatable movement in said fuel passage and having a tapered port movable across said metering edge upon said slidable movement for metering flow of fuel between said inlet and said outlet, said metering member and said adjusting element having interengaging means for causing said slidable movement upon rotation of said valve member, and means operably engageable between said adjusting element and said valve member for normally preventing independent rotation of said adjusting element but being selectively disengageable for adjusting the relative positions of said port and metering edge upon said independent rotation.

2. In a control valve for fuel flow, the combination of a valve casing having an inlet and an outlet for fuel, a rotatable valve member in said casing having a fuel passage affording communication between said inlet and said outlet in the open position of said valve member and defining a metering edge on said valve member, an adjusting element operably associated with said valve member for rotation therewith and having a portion projecting into said fuel passage and spaced from the wall thereof, a metering member slidably but non-rotatably mounted in said casing and having a portion projecting into said fuel passage, said projecting portions being constructed and arranged for causing slidable movement of said metering member upon rotation of said valve member, said metering member having an apertured wall portion defining a tapered port movable across said metering edge upon said slidable movement for metering flow of fuel between said inlet and said outlet, and means operably engageable between said adjusting element and said valve member for normally preventing independent rotation of said adjusting element but being selectively disengageable for adjusting the relative positions of said port and metering edge upon said independent rotation.

3. In a control valve for fuel flow, the combination of a valve casing having an inlet and an outlet for fuel, a rotatable valve member in said casing having a fuel passage affording communication between said inlet and said outlet in the open position of said valve member and defining a metering edge on said valve member, an operating stem projecting from said valve member having an axial aperture therethrough, an adjusting element projecting through said aperture and having a threaded portion spaced from the wall of said fuel passage, a metering member mounted for slidable but non-rotatable movement in said casing, said metering member having a threaded portion cooperable with said threaded portion of said adjusting element for effecting said slidable movement upon rotation of said valve member, said metering member having an annular portion with an inner wall spaced from said threaded portion of said adjusting element and an outer wall engageable with said fuel passage wall, said annular portion having a tapered port movable across said metering edge upon said slidable movement of said metering member for metering flow of fuel between said inlet and said outlet, and means operably engageable between said adjusting element and said stem for normally preventing independent rotation of said adjusting element but being selectively disengageable for adjusting the relative positions of said port and metering edge upon said independent rotation.

References Cited in the file of this patent
UNITED STATES PATENTS

| 1,850,850 | Peterson | Mar. 22, 1932 |
| 1,969,163 | Stevenson | Aug. 7, 1934 |
| 2,650,612 | Brumbaugh | Sept. 1, 1953 |

FOREIGN PATENTS

| 772,759 | France | of 1934 |